United States Patent
Kidde

[15] 3,635,659
[45] Jan. 18, 1972

[54] PROCESS FOR THE PRODUCTION OF $(NH_4)_3AlF_6$

[72] Inventor: Gustave E. Kidde, 294 California Terrace, Pasadena, Calif. 91105

[22] Filed: Mar. 25, 1970

[21] Appl. No.: 22,671

Related U.S. Application Data

[63] Continuation-in-part of Ser. No. 839,096, July 3, 1969, abandoned, Continuation-in-part of Ser. No. 575,205, July 18, 1966, abandoned, Continuation-in-part of Ser. No. 483,241, Aug. 27, 1965, abandoned, Continuation-in-part of Ser. No. 328,126, Dec. 4, 1963, abandoned.

[52] U.S. Cl. ........................................23/88, 23/153, 23/193
[51] Int. Cl. ..........................................C01f 7/50, C01c 1/16
[58] Field of Search ........................................23/88, 153, 193

[56] References Cited

UNITED STATES PATENTS

| | | | |
|---|---|---|---|
| 1,300,110 | 4/1919 | Betts | 23/88 X |
| 2,075,370 | 3/1937 | Strathmeyer | 23/88 |
| 2,981,597 | 4/1961 | Tarbutton et al. | 23/88 |
| 3,197,276 | 7/1965 | Forrat | 23/88 |
| 3,501,268 | 3/1970 | Laran et al. | 23/88 X |

FOREIGN PATENTS OR APPLICATIONS

| | | | |
|---|---|---|---|
| 179,082 | 8/1935 | Switzerland | 23/88 |
| 245,666 | 11/1946 | Switzerland | 23/88 |
| 635,553 | 4/1950 | Great Britain | 23/88 |

*Primary Examiner*—Edward Stern
*Attorney*—Lyon & Lyon

[57] ABSTRACT

This invention relates to a process for the production of $(NH_4)_3AlF_6$, comprising reacting together hydrated alumina and a compound selected from the group consisting of ammonium bifluoride and ammonium fluoride and recovering $(NH_4)_3AlF_6$.

1 Claims, No Drawings

PROCESS FOR THE PRODUCTION OF $(NH_4)_3AlF_6$

This application is a continuation-in-part of my copending application, Ser. No. 839,096, filed July 3, 1969 which was a continuation-in-part of my applications Ser. No. 575,205, filed July 18, 1966, now abandoned, Ser. No. 328,126, filed Dec. 4, 1963, now abandoned and Ser. No. 483,241, filed Aug. 27, 1965, now abandoned, the disclosures of which are incorporated herein by reference.

This invention relates to the production of $(NH_4)_3AlF_6$ and $AlF_3$. The increasing use of $AlF_3$ as a replacement for or a supplement to the cryolite used in the production of aluminum metal has created a large demand for this fluoride compound. However, in the present methods of making such compounds the costs are relatively high. Some processes for their manufacture have required the use of an expensive acid salt. Furthermore, such processes have produced an acid ammonium salt which must be recovered because of its value, thus requiring additional washing and recovery steps. Prior processes also have produced mixtures of alumina and aluminum fluoride salts which are undesirable in the case where the single salt is desired.

It is thus an object of the present invention to provide a novel process for the production of $(NH_4)_3AlF_6$ or $AlF_3$ which does not require an acid salt as a starting material.

A further object in the present invention is to provide a process for the production of an essentially 100 percent $(NH_4)_3AlF_6$. These and other objects of the present invention will become apparent from the specification and examples which follow.

The present invention provides a process for the production of $(NH_4)_3AlF_6$ and $AlF_3$ comprising reacting together hydrated alumina and a compound selected from the group consisting of ammonium bifluoride and ammonium fluoride and recovering the $(NH_4)_3AlF_6$.

The reaction can be carried out using either ammonium fluoride or ammonium bifluoride which can be obtained economically by the neutralization of fluosilicic acid, by the reaction of fluorspar and ammonium sulfate, by the reaction of aluminum fluosulfate and ammonium sulfate, by the reaction of fluorspar and ammonium bisulfate and the neutralization of the hydrogen fluoride evolved with the ammonia or by the reaction of fluorspar and sulfuric acid with the neutralization of the hydrogen fluoride with ammonia.

In general, it can be seen that commercial grades of ammonium fluoride and ammonium bifluoride are satisfactory. The ammonium fluoride and ammonium bifluoride is preferably used in the reaction of this invention as an aqueous solution of any desired concentration. Preferably a saturated or nearly saturated solution is used.

Due to its method of preparation, the ammonium fluoride solution may contain free ammonia which will normally be liberated during the course of the reaction.

Hydrated alumina is then added to the solution of ammonium fluoride or ammonium bifluoride. In general, any commercial grade of the trihydrate of alumina, including $Al_2O_3 \cdot 3H_2O$ and aluminum hydroxide is satisfactory. Lower yields of $(NH_4)_3AlF_6$ may be experienced with materials such as calcined aluminas which normally contain only small amounts of the trihydrate of alumina.

The ratio of reactants is preferably the stoichiometric ratio, which permits conversion of all fluorine to the ammonium fluoroaluminate. Any unconverted alumina will of course be in the end product. The amount of alumina acceptable in the end product will be a factor in determining how much the ratio of reactants can vary from the stoichiometric ratio. In commercial triammonium fluoroaluminates, the percentage of alumina is up to 12 percent by weight.

The following equations can be used to represent the reactions that occur in the process of this invention and can be used as a basis for calculating the stoichiometric ratios of reactants. When ammonium fluoride is used the reaction is:

$$Al_2O_3 \cdot 3H_2O + 12NH_4F \rightarrow 2(NH_4)_3AlF_6 + 6NH_3\uparrow + 6H_2O$$

When ammonium fluoride and free ammonia are used the reaction is as follows:

$$Al_2O_3 \cdot 3H_2O + 12NH_4F + NH_3(\text{free}) \rightarrow 2(NH_4)_3AlF_6 + 6NH_3\uparrow + NH_3(\text{free})\uparrow + 6H_2O$$

When ammonium bifluoride is used the reaction is as follows:

$$Al_2O_3 \cdot 3H_2O + 6NH_4F \cdot HF \rightarrow 2(NH_4)_3AlF_6 + H_2O$$

It should be understood that the foregoing equations are merely set forth as representing the most likely overall reactions. Thus it is likely that in the case of the reaction with ammonium fluoride, the ammonium fluoride first forms ammonium bifluoride which then reacts with the hydrated alumina. Thus, the invention is in no way limited to the specific reactions set forth above.

The reaction may be carried in any suitable vessel and it is preferred in order to keep the reactants and product in suspension.

The temperature of the reaction may vary over a wide range. However, it is preferred that the temperature be maintained in the range of about 190° to about 210° F.

The reaction product, $(NH_4)_3AlF_6$ is insoluble in the aqueous reaction solution and can be recovered by various means such as filtration. The $(NH_4)_3AlF_6$ may be considered the end product, or it may be further processed in order to obtain alumina fluoride.

In the recovery of aluminum fluoride, the triammonium fluoroaluminate product is first dehydrated at a temperature below about 300° F. at atmospheric pressure, preferably below about 250° F., until the composition has an extremely low water content. As a practical matter, about 3 percent water is the maximum amount which may be tolerated for commercial operations. Preferably, the water content is reduced to less than about 1 percent. This dehydrated product may then be sublimed at a temperature in the range of from about 500° to about 1,200° F., preferably at a temperature in the range of from about 700° to about 950° F., to produce aluminum fluoride, the reaction may be:

$$(NH_4)_3AlF_6 + \text{heat} \rightarrow AlF_3 + 3NH_4F$$

or they may proceed stepwise according to:

$$(NH_4)_3AlF_6 + \text{heat} \rightarrow (NH_4)_2AlF_5 + NH_4F$$
$$(NH_4)_2AlF_5 + \text{heat} \rightarrow NH_4AlF_4 + NH_4F$$
$$(NH_4)AlF_4 + \text{heat} \rightarrow AlF_3 + NH_4F$$

The dehydration step is extremely important because it has been found that the presence of a substantial amount of water during the sublimation procedure has a most detrimental affect on the yield of aluminum fluoride product. The function of the water in decreasing yield is believed to involve hydrolysis between the water and the aluminum fluoride which is produced by sublimation. Possible reactions might be:

$$2AlF_3 \cdot H_2O + H_2O \rightarrow Al_2O_3 + 6HF \text{ or } 2AlF_3 + 3H_2O \rightarrow Al_2O_3 + 6HF.$$

The present invention can be more fully understood by reference to the examples which follow:

EXAMPLE 1

Six hundred eight grams of reagent-grade ammonium fluoride were dissolved in 1,700 grams of water and then 213 grams of hydrated alumina $(Al_2O_3 \cdot H_2O)$ were added. The mixture was agitated mechanically and heated for 4 hours. The slurry was filtered and the cake dried at 300° F. to less than 3 percent water by weight. The dry cake weighed 535 grams and contained 58.1 percent fluorine and 25.3 percent ammonia. X-ray analysis showed the material to be triammoniumfluoroaluminate $((NH_4)_3AlF_6)$. The filtrate weighed 788 grams and contained 0.23 percent fluorine and 0.10 percent ammonia.

The fluorine balance is:

| | |
|---|---|
| Fluorine: in | 312.2 g. |
| Fluorine: out | |
| In cake | 310.8 g. |
| In filtrate | 1.8 g. |
| Total | 312.6 g. |
| % accounted for | 100.0% |

A portion of the dry cake was heated at 900° F. for 6 hours. The product contained 66.0 percent fluorine and X-ray analysis showed it to be aluminum fluoride.

EXAMPLE 2

Six hundred eight grams of reagent-grade ammonium fluoride were dissolved in a solution containing 1,700 grams of water and 68 grams of free ammonia. Then 213 grams of hydrated alumina were added, heat was applied and the slurry mechanically agitated for 5 hours. The slurry was filtered and dried at 300° F. to less than 3 percent water by weight. The dry cake weighed 524 grams and contained 58.0 percent fluorine and 25.9 percent ammonia. X-ray analysis showed it to be 100 percent triammoniumfluoroaluminate (($NH_4$)$_3$$AlF_6$). The filtrate weighed 762 grams and contained 0.12 percent fluorine and 0.45 percent ammonia.

The fluorine balance is:

| | |
|---|---|
| Fluorine: in | 312.2 g. |
| Fluorine: out | |
| In cake | 303.9 g. |
| In filtrate | 0.9 g. |
| Total | 304.8 g. |
| % fluorine accounted for | 97.6% |

The aluminum balance is:

| | |
|---|---|
| Aluminum: in | 73.7 g. |
| Aluminum: out | 72.6 g. |
| % accounted for | 98.5% |

A portion of the dry cake was heated at 900°–950° F. for 5 hours and the end product contained 65.9 percent fluorine and X-ray analysis showed it to be 100 percent aluminum fluoride.

EXAMPLE 3

Five hundred twenty-three grams of commercial ammonium bifluoride were dissolved in 2,080 grams of water and then 226 grams of $Al_2O_3 \cdot 3H_2O$ were added and the slurry agitated and heated for 4 hours. At the end of this time the solids were filtered, dried at 300° F. to less than 3% water by weight and analyzed. Dry cake weighed 563.2 grams and had 58.1 percent fluorine and 25.9 percent ammonia. Filtrate weighed 2,011 grams and contained 0.11 percent fluorine and 0.4 percent ammonia. X-ray of dry cake was 100 percent ($NH_4$)$_3$$AlF_6$.

Fluorine balance is:

| | |
|---|---|
| Fluorine: in | 348.7 g. |
| Fluorine: out | |
| In cake | 327.2 g. |
| In filtrate | 2.2 g. |
| Total | 329.4 g. |
| % fluorine accounted for | 94.5% |

Aluminum balance is:

| | |
|---|---|
| Aluminum: in | 78.2 g. |
| Aluminum: out | 78.0 g. |
| % accounted for | 99.77% |

A small portion of dry cake was heated to 900°–950° F for 5 hours. X-ray analysis showed product to be aluminum fluoride.

From the foregoing specification and examples, it can be seen that many variations of the present invention are possible. A primary feature of the invention is the reaction of the trihydrate of alumina with ammonium fluoride or ammonium bifluoride. This reaction may be carried out under a wide range of conditions to obtain a triammoniumfluoroaluminate compound. Although the conditions may vary the yield of the triammoniumfluoroaluminate, they are all within the scope of the present invention. Thus, it can be seen that the foregoing examples and specifications are merely illustrative examples of the invention and should not be taken as limiting the scope of the present invention because it is applicant's intent that the scope of the present invention be limited only by the lawful scope of the claims which follow.

I claim:

1. A process for the production of ($NH_4$)$_3$$AlF_6$, comprising reacting together trihydrated alumina and ammonium bifluoride in an aqueous solution at a temperature of about 190° to 210° F., 1 mole of hydrated alumina being reacted with 6 moles of ammonium bifluoride and recovering the insoluble product ($NH_4$)$_3$$AlF_6$.

* * * * *